United States Patent [19]

Babbitt

[11] 4,338,110

[45] Jul. 6, 1982

[54] BUSHING FOR PRODUCING GLASS FIBERS

[75] Inventor: William M. Babbitt, Granville, Ohio

[73] Assignee: Owens-Corning Fiberglas Corporation, Toledo, Ohio

[21] Appl. No.: 251,589

[22] Filed: Apr. 6, 1981

Related U.S. Application Data

[63] Continuation of Ser. No. 190,119, Sep. 24, 1980, abandoned.

[51] Int. Cl.³ .......................................... C03D 37/025
[52] U.S. Cl. .............................................. 65/1; 65/2; 65/10.1
[58] Field of Search ................................ 65/1, 2, 10.1

[56] References Cited

U.S. PATENT DOCUMENTS 3,561,939  2/1971  Froberg et al. ...................... 65/135

FOREIGN PATENT DOCUMENTS 1051516  1/1954  France ..................................... 65/1
 582472  11/1946  United Kingdom ..................... 65/1

Primary Examiner—Robert L. Lindsay, Jr.
Attorney, Agent, or Firm—Ronald C. Hudgens; Philip R. Cloutier; Paul J. Rose

[57] ABSTRACT

The bushing (10) has a plurality of hollow bushing branches (10a, 10b, 10c, 10d) open to and extending radially from a central supply space (10e), resulting in better temperature control compared to a rectangular bushing with the same number of holes.

3 Claims, 8 Drawing Figures

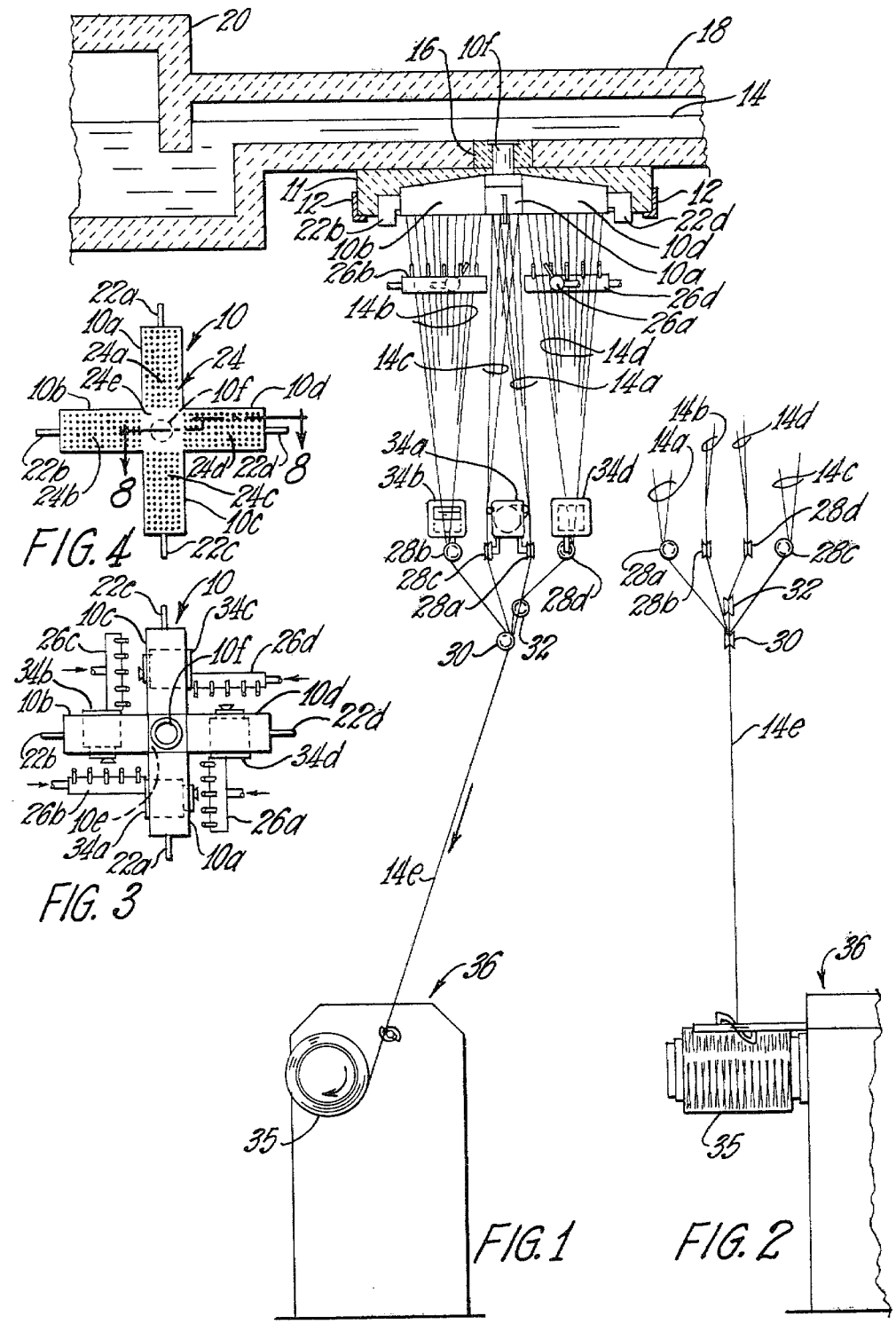

BUSHING FOR PRODUCING GLASS FIBERS

This is a continuation of application Ser. No. 190,119, filed Sept. 24, 1980 now abandoned.

TECHNICAL FIELD

This invention relates generally to apparatus for producing fibers from thermoplastic or heat-softenable materials such as glass, and more particularly to an improved bushing or feeder construction.

BACKGROUND ART

Present bushings through which molten glass is drawn to produce continuous glass filaments may have as many as four thousand orifices arranged in forty rows of one hundred orifices. The bushings are usually made of a platinum alloy and are electrically heated by passage of electrical current therethrough. The viscosity of glass at or near fiber forming temperatures changes rapidly with slight changes in temperatures. Therefore, in drawing glass fibers, it is important to maintain the temperature of the bushing as nearly uniform as possible throughout its entire orifice area. With the rectangular pattern of orifices present in bushings existing before my invention, uniformity of temperature becomes harder to accomplish as bushings are made larger and provided with more orifices to increase throughput. Non-uniformity of temperature across the bottom of the bushing results in production of fibers with different diameters and may result in breaking of fibers in relatively hotter spots or freezing of the glass in relatively cooler spots.

DISCLOSURE OF INVENTION

In accordance with the invention, a bushing is provided with a central supply area for molten glass and with a plurality of orifice plate portions, having equal number of holes, extending radially from the supply area.

Compared to a single rectangular plate, this distribution results in smaller orifice plate portions for the same number of holes. With the smaller orifice plate portions, substantial uniformity of temperature is more easily accomplished. Further, more efficient use of finshields is possible on tipped bushings and better air penetration is possible on air cooled tipless bushings.

BRIEF DESCRIPTION OF DRAWINGS

The invention is more specifically described with reference to the accompanying drawings in which:

FIG. 1 is an elevational view, partly in section, of glass fiber making apparatus including a bushing constructed in accordance with the invention and showing the output from the bushing gathered into and wound in one strand;

FIG. 2 is an elevational view of a portion of the apparatus of FIG. 1, taken from the right-hand side thereof;

FIG. 3 is a top plan view of the bushing of FIG. 1 and certain associated apparatus;

FIG. 4 is a bottom plan view of the bushing of FIG. 1;

BEST MODE OF CARRYING OUT THE INVENTION

Figures 5, 6:
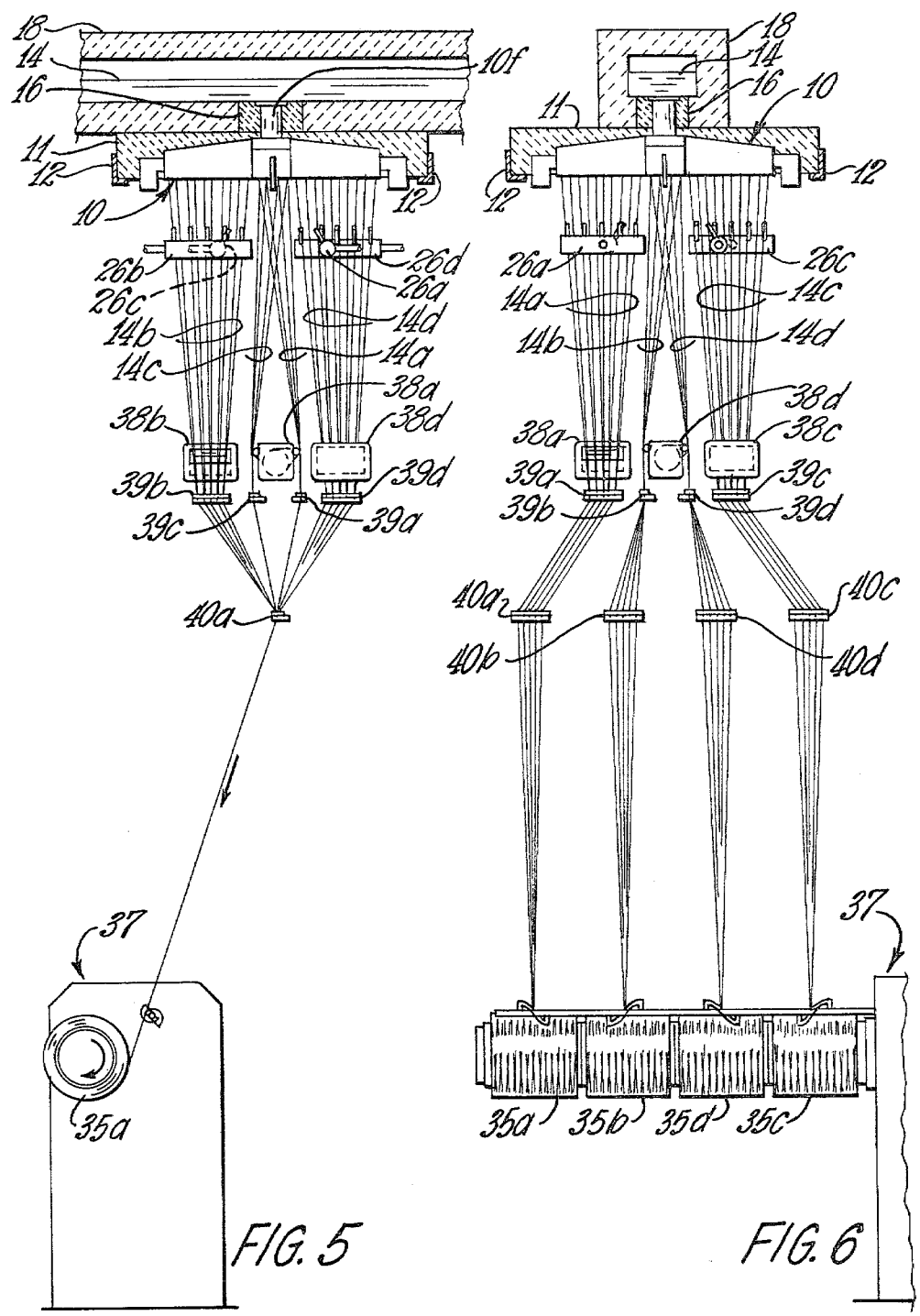
FIGS. 5 to 7 are views similar to FIGS. 1 to 3, but with the output from the bushing gathered into and wound in four strands.

With respect to the drawings, FIGS. 1, 3, 4, and 8 show a bushing 10 constructed in accordance with the invention. The bushing 10 is encased in refractory material 11 supported by angle brackets 12 and is fed molten glass 14 through a tubular inlet 10f mounted in a circular bushing block 16 disposed in the bottom wall portion of a forehearth 18 of a furnace 20.

The tubular inlet 10f feeds molten glass 14 into a central supply space 10e which supplies the glass to four hollow bushing branches 10a, 10b, 10c, and 10d open to and extending radially from the supply space 10e and closed at their radially outer ends by endwalls having L-shaped electrical terminals 22a, 22b, 22c, and 22d connected respectively thereto.

A cross-sectional bottom plate 24 (FIG. 4) includes an unperforated central portion 24e beneath the inlet 10f and four perforated leg portions 24a, 24b, 24c, and 24d welded thereto and respectively forming orifice plate portions of the bushing branches 10a, 10b, 10c, and 10d. The holes in the orifice plate portions of the plate 24 are shown only schematically. Actually, the number of holes in each of the orifice plate portions may be as great as four thousand. Preferably, the holes have a diameter of forty to sixty mils and are centered sixty to one hundred mils apart.

The molten glass 14 is drawn through the orifice plate portions 24a, 24b, 24c, and 24d respectively into four groups 14a, 14b, 14c, and 14d of continuous glass filaments. As it emerges from the orifice plate portions, the molten glass is air quenched by air from conventional manifold and nozzle assemblies 26a, 26b, 26c, and 26d suitably supported respectively beneath the orifice plate portions. The four groups of glass filaments are gathered into strands respectively at suitably supported gathering shoes 28a, 28b, 28c, and 28d, and the four strands are further combined into a single strand 14e at a suitably supported gathering shoe 30, the strand from gathering shoe 28d being additionally guided by a shoe 32. Before entering the gathering shoes 28a, 28b, 28c, and 28d, the groups 14a, 14b, 14c, and 14d of glass filaments are passed respectively over the belts of conventional size applicators 34a, 34b, 34c, and 34d. The strand 14e is wound into a package 35 by conventional winding apparatus 36.

Figure 7:
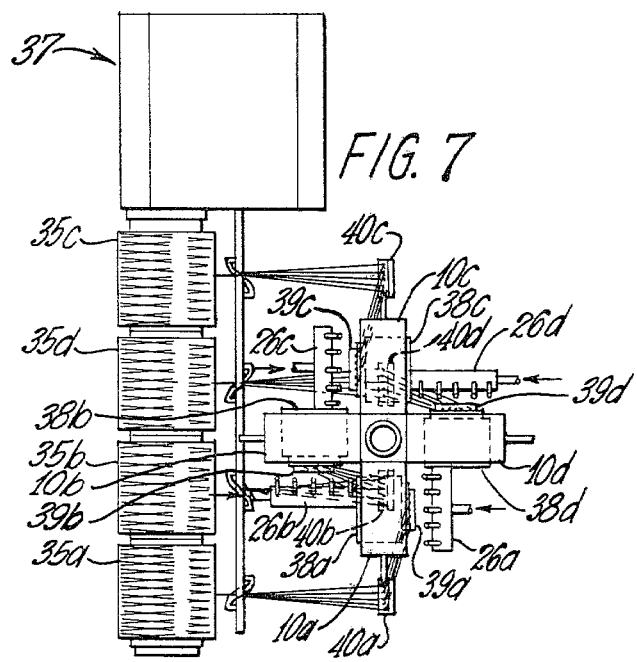
Figure 8:
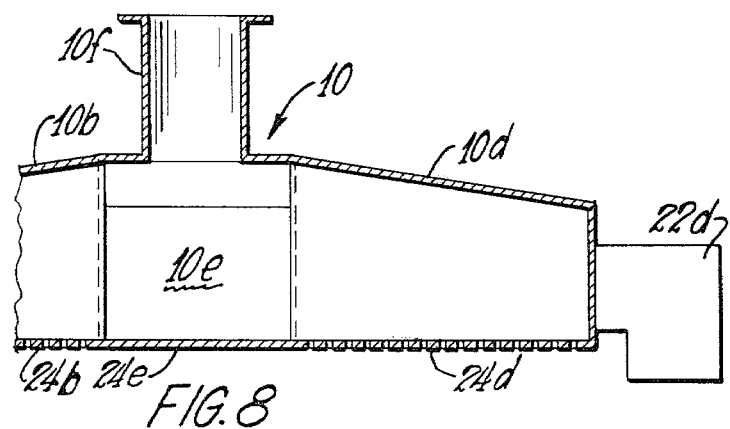
FIG. 8 is a fragmentary enlarged vertical sectional view taken generally along the line 8—8 of FIG. 4.

Instead of the groups 14a, 14b, 14c, and 14d of filaments being combined into one strand and the strand being wound into just one package, FIGS. 5-7 show the filament groups being formed respectively into four strands each with one-fourth as many filaments and wound into four separate packages 35a, 35b, 35c, and 35d by conventional winding apparatus 37 after passing respectively over the belts of conventional size applicators 38a, 38b, 38c, and 38d and through strand splitting shoes 39a, 39b, 39c, and 39d and 40a, 40b, 40c, and 40d.

Although the bushing 10 has been shown as an air-cooled tipless bushing, the invention is equally applicable to tipped bushings with water-cooled fin shields.

Various modifications may be made in the structure shown and described without departing from the spirit and scope of the invention.

I claim:

1. A bushing (10) useful in the drawing of glass fibers from molten glass (14) and comprising a tubular inlet (10f) leading to a central supply space (10e) and a plurality of hollow bushing branches (10*a*, 10*b*, 10*c*, 10*d*) open to and extending radially from the supply space (10*e*).

2. A bushing (10) as claimed in claim 1 wherein there are four bushing branches (10*a*, 10*b*, 10*c*, 10*d*) equally arcuately spaced from each other.

3. A bottom plate (24) for a bushing (10) useful in the drawing of glass fibers from molten glass, the plate being cross-shaped and including an unperforated central portion (24*e*) and four perforated leg portions (24*a*, 24*b*, 24*c*, 24*d*) extending therefrom in equally arcuately spaced relationship to each other, the leg portions being orifice plate portions of four bushing branches (10*a*, 10*b*, 10*c*, 10*d*).

* * * * *